United States Patent [19]
Wehrli et al.

[11] 3,720,667
[45] March 13, 1973

[54] 20-PYRROLECARBOXYLIC ACID ESTER OF 20-HYDROXY-Δ[16]-PREGNENE DERIVATIVES

[75] Inventors: Hansuli Wehrli, Schaffhausen; Oskar Jeger, Zollikerberg, Zurich, both of Switzerland

[73] Assignee: Ciba-Geigy Corporation, Ardsley, N.Y.

[22] Filed: June 11, 1970

[21] Appl. No.: 45,588

[30] Foreign Application Priority Data

June 13, 1969 Switzerland..........................9122/69

[52] U.S. Cl.........260/239.55 R, 260/239.5, 260/999
[51] Int. Cl............................................C07c 173/10
[58] Field of Search ......./Machine Searched Steroids

[56] References Cited

UNITED STATES PATENTS

| | | | |
|---|---|---|---|
| 2,949,405 | 8/1960 | Wettstein et al. | 195/51 |
| 3,131,125 | 4/1964 | Wettstein et al. | 167/65 |
| 3,374,230 | 3/1968 | Gardner et al. | 260/239.55 |

*Primary Examiner*—Henry A. French
*Attorney*—Karl F. Jorda and Bruce M. Collins

[57] ABSTRACT

Compounds of the class of 20-pyrrolecarboxylic acid esters of 20-hydroxy-Δ[16]-pregnenes have cardiotonic activity; they are active ingredients of pharmaceutical compositions and have useful cardiotonic activity; a typical example is the 20-(2,4-dimethyl-pyrrole-3-carboxylic acid ester) of 3α,9α-epoxy-14β,18-(epoxyethano-N-methylimino)-5β-pregna-7,16-diene-3β,11α,20α-triol.

3 Claims, No Drawings

20-PYRROLECARBOXYLIC ACID ESTERS OF 20-HYDROXY-Δ¹⁶-PREGNENE DERIVATIVES

DETAILED DISCLOSURE

The present invention relates to 20-pyrrolecarboxylic acid esters of 20-hydroxy-$\Delta^{16}$-pregnenes having useful pharmacological properties, and to pharmacological compositions containing them.

More particularly, the present invention relates to compounds of formula I,

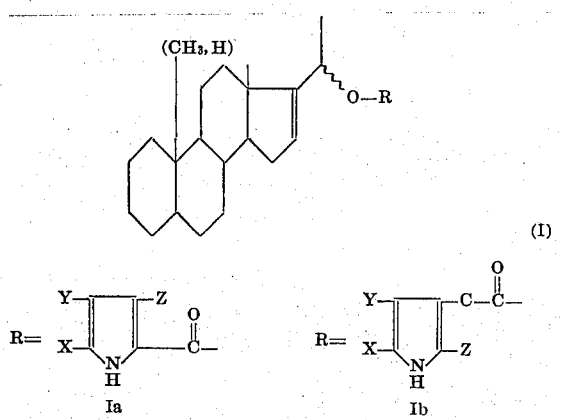

wherein
R is the acyl radical of the unsubstituted pyrrole-2-carboxylic acid or pyrrole-3-carboxylic acid, or the acyl radical of a pyrrole-2-carboxylic acid or pyrrole-3-carboxylic acid substituted by one to three lower alkyl groups, i.e. a radical of formula Ia or Ib, wherein X, Y and Z denote hydrogen and/or lower alkyl groups, whereby the 20-acyloxy group can be in the α- or β-position, and in the further unoccupied positions of the steroid structure, there can be double bonds and/or further monovalent, geminal bivalent or non-geminal polyvalent substituents such as free, esterified or etherified hydroxyl groups, halogen atoms, azido groups, amino groups, additional methyl groups, hydroxymethyl groups or free or protected oxo radicals, or epoxy radicals, imino and substituted imino groups such as methylimino groups, halogen- and dihalogenmethylene groups, ethano, hydroxyethano, alkoxyethano and oxoethano groups, or combinations of such radicals such as epoxymethano, methylenedioxy, dimethylmethylenedioxy, epoxyethanoepoxy, epoxyethanoimino and N-methylepoxyethanoimino groups.

An acyl radical of the unsubstituted or of a substituted pyrrole-2-carboxylic acid, in accordance with the above definition, is derived, e.g. from pyrrole-2-carboxylic acid, 3-methyl-pyrrole-2-carboxylic acid, 3-ethyl-pyrrole-2-carboxylic acid, 4-methyl-pyrrole-2-carboxylic acid, 4-ethyl-pyrrole-2-carboxylic acid, 5-methyl-pyrrole-2-carboxylic acid, 5-ethyl-pyrrole-2-carboxylic acid, 3,4-dimethyl-pyrrole-2-carboxylic acid, 3,5-dimethyl-pyrrole-2-carboxylic acid, 4,5-dimethyl-pyrrole-2-carboxylic acid, e.g. from 3,4,5-trimethyl-pyrrole-2-carboxylic acid. An acyl radical of the unsubstituted or of a substituted pyrrole-3-carboxylic acid, in accordance with the above definition, is derived, e.g., from pyrrole-3-carboxylic acid, 2-methyl-pyrrole-3-carboxylic acid, 2-ethyl-pyrrole-3-carboxylic acid, 4-methyl-pyrrole-3-carboxylic acid, 4-ethyl-pyrrole-3-carboxylic acid, 5-methyl-pyrrole-3-carboxylic acid, 5-ethyl-pyrrole-3-carboxylic acid, 2,4-dimethyl-pyrrole-3-carboxylic acid, 2,5-dimethyl-pyrrole-3-carboxylic acid, 4,5-dimethyl-pyrrole-3-carboxylic acid, 2-ethyl-4-methyl-pyrrole-3-carboxylic acid, 2,4,5-trimethyl-pyrrole-3-carboxylic acid, or from 2,4,5-triethyl-pyrrole-3-carboxylic acid.

The 20-hydroxysteroids used as starting materials for the present process and corresponding to formula II,

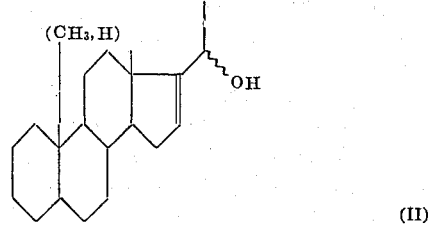

which are not claimed within the scope of the present application, preferably belong to the 5α-pregn-16-ene, 5β-pregn-16-ene, pregna-4,16-diene and pregna-5,16-diene series, as well as to the corresponding 19-nor-series, and may additionally contain one or more of the substituents and groupings given under formula I, in one or more of the positions 1,2,3,4,5,6,7,8,9,11,12,14,15,16,18,19 and 21, as well as one or more further double bonds. Starting materials of the batrachotoxinin A type, i.e., containing a $C_3$–$C_9$ epoxy group and a 14β,18-epoxyethano-N-methylimino group are obtained as described in J. Am. Chem. Soc., 90, 1917(1968). The other starting materials are readily available according to methods well-known in the art.

The process according to the invention for the production of the compounds of formula I, is characterized in that a 20-hydroxy-$\Delta^{16}$-pregnene compound of formula II is acylated at room temperature in a two-phase solvent mixture, consisting of an organic solvent not water-miscible such as, e.g. methylene chloride, chloroform or benzene, and an aqueous base such as aqueous sodium hydroxide solution or potassium hydroxide solution with the mixed anhydride of a pyrrole-2- or 3-carboxylic acid, the acyl radical of which corresponds to formula Ia or Ib, and a lower alkoxyformic acid such as, e.g. ethoxy- or isobutoxyformic acid, and, optionally, further reactions are subsequently performed on the substituents additionally present. The mixed anhydrides of the above-mentioned pyrrole-carboxylic acids, used according to the process, are produced, e.g. by reaction of these acids with lower chloroformic acid alkyl esters in a solvent, such as tetrahydrofuran or dioxane, in the presence of an organic base such as, e.g. triethylamine or pyridine, at room temperature.

The new compounds of formula I possess valuable pharmacological properties; they influence, in particular, by their cardiotonic activity, the blood circulation. They also constitute, however, valuable intermediates for the production of other useful substances, especially pharmacologically effective compounds.

The present invention relates also to the production of pharmaceutical preparations for application in human and veterinary medicine and which contain, as active substances, the new, above defined, pharmacologically effective compounds of formula I of the present application, together with a pharmaceutically acceptable carrier material. Used as carriers are organic or inorganic substances which are suitable for enteral administration, e.g. oral, parenteral or topical administration. Suitable for the formation of these are substances which do not react with the new compounds, such as, e.g. water, gelatine, lactose, starch, magnesium stearate, talcum, vegetable oils, benzyl alcohols, rubber, polyalkylene glycols, vaselines, cholesterin, and other known medicament carriers. The pharmaceutical preparations can be in solid form, e.g. as tablets, dragees or capsules, or they can be in liquid form or semi-liquid form as solutions, suspensions, emulsions, ointments or creams. Optionally, these pharmaceutical preparations are sterilized and/or they contain auxiliaries such as preservatives, stabilizers, wetting or emulsifying agents, salts for modifying the osmotic pressure, or buffers. They may also contain other therapeutically valuable substances. The new compounds can also serve as starting materials for the production of other valuable compounds. The compounds of the present application can also be used as animal-feed additives.

The invention is described in more details in the following examples. The temperatures are given in degrees Centigrade. The IR.-spectra are measured in chloroform; the absorption bands are expressed in $cm^{-1}$. The UV.-spectra are measured in ethanol; $\epsilon$-values are in brackets.

EXAMPLE 1

100 mg of 3-oxo-20$\beta$-hydroxy-$\Delta^{4,16}$-pregnadiene are dissolved in 20 ml of chloroform and 10 ml of aqueous 0.2N potassium hydroxide solution are added. To this mixture is added dropwise in the course of 8 hours, with vigorous stirring, a solution of 1 g of the mixed anhydride from 2,4,5-trimethyl-pyrrole-3-carboxylic acid and ethyl chloroformate in 20 ml of chloroform, and stirring is then continued for a further ca. 14 hours. The reaction mixture is concentrated by evaporation in vacuo, the residue dissolved in ethyl acetate, the solution washed with saturated sodium chloride solution until a neutral reaction is indicated, and again concentrated by evaporation. Chromatography of the residue in chloroform/methanol on silica gel yields 70 mg of 3-oxo-20$\beta$-hydroxy-$\Delta^{4,16}$-pregnadiene-20$\beta$-(2,4,5-trimethyl-pyrrole-3-carboxylic acid ester). UV: 238 nm (17200), 271 nm (5000). IR: 3400, 1690–1660, 1620.

The mixed anhydride used in the above example is produced as follows:

0.90 g of 2,4,5-trimethyl-pyrrole-3-carboxylic acid and 0.60 g of triethylamine are dissolved in 10 ml of tetrahydrofuran, and to the solution is added at 0° a solution of 0.65 g of ethyl chloroformate in 3 ml of tetrahydrofuran. After being allowed to stand for 5 hours at room temperature, the solution is concerned by evaporation in vacuo, and the residue dissolved in benzene. The benzene solution is washed with dilute hydrochloric acid and with sodium bicarbonate solution until a neutral reaction is indicated, and is then concentrated by evaporation. Recrystallization of the residue from benzene/cyclohexane yields 1.15 g of mixed anhydride of 2,4,5-trimethyl-pyrrole-3-carboxylic acid and ethoxyformic acid, M.P. 93°.

The mixed anhydrides for Examples 4 and 5 are produced analogously.

EXAMPLE 2

100 mg of 3-oxo-20$\alpha$-hydroxy-$\Delta^{4,16}$-pregnadiene are reacted as in Example 1 to obtain 55 mg of 3-oxo-20$\alpha$-hydroxy-$\Delta^{4,16}$-pregnadiene-20$\alpha$-(2,4,5-trimethylpyrrole-3-carboxylic acid ester). UV: 238 nm (18200), 271 nm (4900). IR: 3400, 1690–1660, 1620.

EXAMPLE 3

10 mg of batrachotoxinin A (3$\alpha$,9$\alpha$-epoxy-14$\beta$,18-(epoxyethano-N-methylimino)-5$\beta$-pregna-7,16-diene-3$\beta$,11$\alpha$,20$\alpha$-triol are dissolved in 2 ml of chloroform and to the solution is added 1.0 ml of aqueous 0.2N potassium hydroxide solution. To this mixture is added dropwise in the course of 8 hours, with vigorous stirring, a solution of 0.1 g of the mixed anhydride from 2,4,5-trimethyl-pyrrole-3-carboxylic acid and ethyl chloroformate in 2 ml of chloroform, and stirring is subsequently continued for ca. 14 hours. The reaction mixture is concentrated by evaporation in vacuo, the residue dissolved in ethyl acetate, the solution washed with saturated sodium chloride solution until a neutral reaction is indicated, and again concentrated by evaporation. Chromatography of the residue in chloroform/methanol-(10:1) on silica gel yields 7 g of batrachotoxinin-A-20$\alpha$-(2,4,5-trimethyl-pyrrole-3-carboxylic acid-ester). UV: 232 nm (9500), 260 nm (9000). IR: 3600, 3400, 1690.

EXAMPLE 4

10 mg of batrachotoxinin A are reacted with the mixed anhydride from 2,4-dimethyl-pyrrole-3-carboxylic acid and ethyl-chloroformate analogously to Example 3. By this means are obtained 4 mg of batrachotoxinin-A-20$\alpha$-(2,4-dimethyl-pyrrole-3-carboxylic acid ester). UV: 234 nm (9200), 264 nm (5100). IR: 3600, 3400, 1690.

EXAMPLE 5

5 mg of batrachotoxinin A are reacted with the mixed anhydride from 2-ethyl-4-methyl-pyrrole-3-carboxylic acid and ethyl chloroformate analogously to example 3. By this means are obtained 2 mg of batrachotoxinin-A-20$\alpha$-(2-ethyl-4-methyl-pyrrole-3-carboxylic acid ester). UV: 234 nm (9100), 264 nm (5000).

EXAMPLE 6

50 mg of 3$\alpha$,9$\alpha$-epoxy-14$\beta$,18-(epoxyethano-N-methylimino)-5$\beta$-pregna-16-ene-3$\beta$,11$\alpha$,20-triol are dissolved in 10 ml of chloroform, and 5 ml of aqueous, 0.2-N potassium hydroxide solution are added. To this mixture is added in the course of 8 hours, with vigorous stirring, a solution of 0.5 g of the mixed anhydride from 2,4,5-trimethyl-pyrrol--carboxylic acid and ethyl chloroformate in 10 ml of chloroform; and stirring subsequently proceeds for a further ca. 14 hours. The reaction mixture is concentrated in vacuo, the residue dissolved in ethyl acetate, the solution washed with saturated sodium chloride solution until the reaction is neutral, and again concentrated by evaporation. Chromatography of the residue in chloroform/methanol (10:1) on silica gel yields 35 mg of 3$\alpha$,9$\alpha$-epoxy- 14β,18-(epoxyethano-N-methylimino)-5β-pregna-16-ene-3β,11α,20-triol-20-(2,4,5-trimethyl-pyrrol-3-carboxylic acid-ester). UV: 232 nm (10000). IR: 3600, 3400, 1690.

EXAMPLE 7

100 mg of 3α,9α-epoxy-14β,18-(epoxyethano-N-methylimino)-5β-pregna-16-ene-3β,11α,20-triol are reacted with the mixed anhydride from 2,4-dimethyl-pyrrol-3-carboxylic acid and ethyl chloroformate ester, analogously to Example 6. In this manner are obtained 40 mg of 3α,9α-epoxy-14β,18-(epoxyethano-N-methylimino)-5β-pregna-16-ene-3β,11α,20-triol-20-(2,4-dimethyl2pyrrol-3-carboxylic acid - ester). UV: 234 nm (9000), 264 nm (5000). IR: 3600, 3400, 1690.

EXAMPLE 8

50 mg of 3α,9α-epoxy-14β,18-(epoxyethano-N-methylimino)-5β-pregna-16-ene-3β,11α,20-triol are reacted with the mixed anhydride from 2-ethyl-4-methyl-pyrrol-3-carboxylic acid and ethyl chloroformate, analogously to Example 6. In this manner are obtained 25 mg of 3α,9α-epoxy-14β,18-(epoxyethano-N-methylimino)-5β-pregna-16-ene-3β,11α,20-triol-20-(2-ethyl-4-methyl-pyrrol-3-carboxylic acid-ester). UV: 234 (8900), 264 (4800). IR: 3600, 3400, 1690.

What we claim is:

1. A compound of the formula in which R is the acyl radical of a pyrrole-2-carboxylic acid or pyrrole-3-carboxylic acid of formula Ia or Ib, wherein X, Y and Z denote hydrogen or lower alkyl groups, whereby the 20-acyloxy group can be in the α- or β- position, its 7,8-dehydroderivative and esters and ethers thereof, with the exception of the 20-ester of batrachotoxinin A with 2,4-dimethyl-pyrrole-3-carboxylic acid and the 20-ester of batrachotoxinin A with 2-ethyl-4-methyl-pyrrole 3-carboxylic acid.

2. A compound according to claim 1, which is a 20-ester derived from 3α,9α-epoxy-14β, 18-(epoxyethano-N-methyl-imino)-5β-pregna-7,16-diene-3β,11α,20α-triol and a pyrrolecarboxylic acid defined in claim 1.

3. A compound according to claim 1, which is the 20-(2,4,5-trimethyl-pyrrole-3-carboxylic acid ester) of 3α,9α-epoxy-14β, 18-(epoxyethano-N-methylimino)-5β-pregna-7,16-diene-3β,11α,20α-triol.

* * * * *